(12) United States Patent
Manzano et al.

(10) Patent No.: US 12,197,456 B2
(45) Date of Patent: Jan. 14, 2025

(54) DATA VIRTUALIZATION ADAPTER IN AN INTEGRATION PLATFORM

(71) Applicant: Salesforce, Inc., San Francisco, CA (US)

(72) Inventors: Ignacio Agustin Manzano, Buenos Aires (AR); Jiang Wu, Mountain View, CA (US); Daniel Fujii, Buenos Aires (AR); Rodrigo Pazos, Buenos Aires (AR); Ezequiel Block, Pilar (AR); Luis Contreras, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/479,952

(22) Filed: Sep. 20, 2021

(65) Prior Publication Data

US 2023/0089365 A1 Mar. 23, 2023

(51) Int. Cl.
| | |
|---|---|
| *G06F 16/25* | (2019.01) |
| *G06F 9/54* | (2006.01) |
| *G06F 16/178* | (2019.01) |
| *G06F 16/21* | (2019.01) |
| *G06F 16/28* | (2019.01) |

(52) U.S. Cl.
CPC ............ *G06F 16/254* (2019.01); *G06F 9/541* (2013.01); *G06F 16/1794* (2019.01); *G06F 16/213* (2019.01); *G06F 16/258* (2019.01); *G06F 16/288* (2019.01)

(58) Field of Classification Search
CPC .... G06F 16/254; G06F 16/258; G06F 16/288; G06F 16/213; G06F 9/541; G06F 16/1794
See application file for complete search history.

(56) References Cited

U.S. PATENT DOCUMENTS

| | | | |
|---|---|---|---|
| 10,268,753 B2* | 4/2019 | Bar-Or | G06F 16/2455 |
| 2005/0091251 A1* | 4/2005 | Ramarao | G06F 16/258 |
| 2005/0091285 A1* | 4/2005 | Krishnan | G06F 16/1794 |
| 2007/0022093 A1* | 1/2007 | Wyatt | G06F 16/283 |
| 2007/0299885 A1* | 12/2007 | Pareek | G06F 16/254 |
| 2013/0187926 A1* | 7/2013 | Silverstein | G06F 16/116 345/440 |

(Continued)

*Primary Examiner* — Kris E Mackes
*Assistant Examiner* — Lin Lin M Htay
(74) *Attorney, Agent, or Firm* — Sterne, Kessler, Goldstein & Fox P.L.L.C.

(57) ABSTRACT

Disclosed herein are system, method, and device embodiments for a data bridge adapter in a data integration platform that models any application programming interface as an entity-relationship model. This technique allows an individual using an integration platform to map and transform the entity-relationship model without having to create any custom code. The user may specify target parameters as part of an ETL process, and the entity relationship model may allow appropriate data and API calls to be generated to pass the data to the specified target. By creating an entity-relationship model from any API, the technique further supports versioning, schema change resolution, compatibility detection and other features. Furthermore, data visualization software may use the entity-relationship model to allow users to explore and analyze the data represented in the entity-relationship model.

18 Claims, 7 Drawing Sheets

(56) References Cited

U.S. PATENT DOCUMENTS

| | | | |
|---|---|---|---|
| 2014/0344211 A1* | 11/2014 | Allan | G06F 16/258 |
| | | | 707/602 |
| 2017/0116305 A1* | 4/2017 | Kapoor | G06F 16/211 |
| 2018/0367466 A1* | 12/2018 | Shear | H04L 47/83 |
| 2019/0196890 A1* | 6/2019 | Bucchi | G06F 16/951 |
| 2020/0005266 A1* | 1/2020 | Gruen | G06Q 30/0221 |

* cited by examiner

DATA VIRTUALIZATION ADAPTER IN AN INTEGRATION PLATFORM

BACKGROUND

Integration platforms allow organizations to design, implement, and deploy software systems that harness heterogeneous resources (e.g., applications, services, and data sources) from across an organization's technical landscape. An integration platform may allow users to design integration applications, retrieve and transform data, interact with various application programming interfaces (APIs), deploy integration applications to users, maintain such applications, and visualize, analyze, and explore data. An integration flow often requires significant data exchange to occur between complex and disparate systems not originally designed for interoperability. As such, it can be very difficult to implement comprehensive mechanisms for data-driven analysis across a technical landscape of diverse resources and tools.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the arts to make and use the embodiments.

Figure 1:
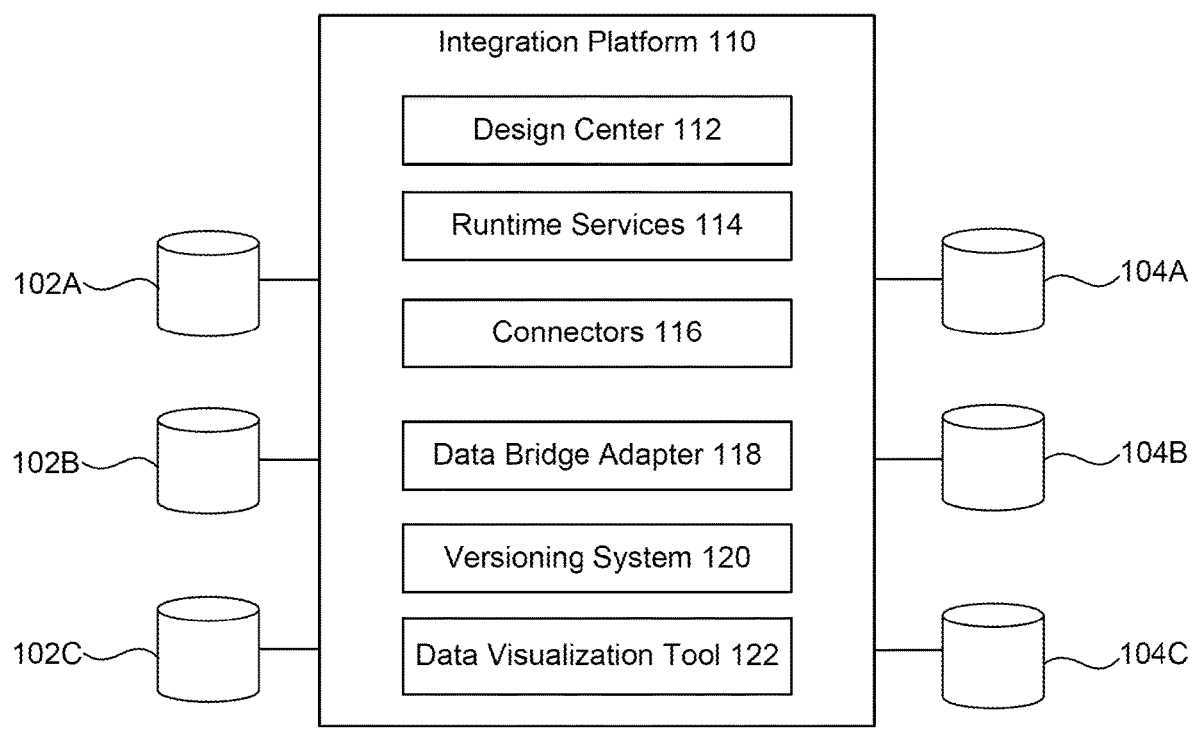
FIG. 1 is a block diagram of environment for including a data integration platform having a data bridge adapter and a diverse set of data sources and data targets, according to some embodiments.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for a data bridge adapter in a data integration platform that creates an entity-relationship model to represent any application programming interface.

An organization's technical landscape may incorporate a wide-array of applications, services, data sources, servers, and other resources. Applications in the landscape may include custom-built applications, legacy applications, database applications, cloud-based applications, enterprise-resource-planning applications, etc. These applications and their associated data may reside on different servers in different locations or data centers and/or be accessed via the cloud. Additionally, organizations may also connect to a wide-array of third-party systems, applications, services, and APIs to access data and incorporate additional functions into their technical landscape.

An integration platform may allow users to create useful business processes, applications, and other software tools that will be referred to herein as integration applications, integration scenarios, or integration flows. An integration flow may leverage and incorporate data from the organization's disparate systems, services, and applications and from third party systems. An integration platform may bridge divides between these disparate technical resources by centralizing communications, using connectors that allow integration flows to authenticate and connect to external resources, databases, Software-as-a-service (SaaS) applications, and to incorporate data and functionality from these external resources into an integration flow.

In one use case, an organization may use an ETL pipeline that draws upon data located in disparate sources, transforms the aggregate data, and stores the data in a data warehouse, relational data store, or other destination for reporting, analysis, or other client-facing applications. However, a developer must create custom code to transform the unstructured data received from the source API into an form that the intended data storage location can ingest. Thus, developers must developers must create and maintain code for each separate ETL scenario facing an organization, which may become arduous.

In another use case, organizations may use data visualization software that allows developers to use advanced visualization techniques to explore and analyze data. For example, an analyst may use TABLEAU or another visualization tool to generate advanced graphs, tables, and other data visualizations. However, while data visualization software may readily integrate data from cloud-based or local relational databases sources, these tools are often incapable of utilizing the unstructured and varied data received from APIs and other data sources using legacy techniques. Again, a developer must create custom code to transform the unstructured data received from the source API to a form that can be ingested by the visualization tool.

In either scenario and in others, organizations may need to develop a massive amount of software code to address the matching, transformation, storage, and processing of results from every type of API accessed in the larger context of the organization's technical landscape. The amount of complexity is augmented by the fact that organization's frequently access information in data storage formats that do not have an API to access, e.g., text-files, CSV files, spreadsheets, file servers, etc. This creates an extensive amount of legacy code to manage and maintain and may be extremely burdensome. No legacy technique or system provides a solution to ease this burden.

Accordingly, a need exists to provide a standardized method within an integration platform of deriving an entity-relationship model from any API or other data source. This technique allows integration platform users to map and transform the entity-relationship model without having to create any custom code. The user may specify target parameters as part of an ETL process, and the entity relationship model may pass the data received from the source API to the specified target. By creating an entity-relationship model from any API, the technique supports versioning, schema change resolution, and compatibility detection. Furthermore, data visualization software may then use the entity-relationship model to allow further exploration nd analysis of the data received from the API. The disclosed data virtualization techniques are technology agnostic and can be scaled to address any data source that can be modeled using a dialect.

FIG. 1 is a block diagram of environment 100 for modeling application programming interfaces as an entity-relationship models in a data integration platform. As illustrated in FIG. 1, environment 100 may include data sources 102, data targets 104, and integration platform 110.

Data sources 102, e.g., data source 102A, data source 102B, data source 102C, may be an API other technical resource. While three data sources 102 are illustrated in FIG. 1 for reference, there may be any number of data sources 102 in environment 100. In some embodiments, data sources 102 may represent a plurality of APIs that integration platform 110 may interact with to receive and update data. An API exposed by data sources 102 may adhere to one of a number of API design methodologies or protocols. For example, the API may be a WebAPI such as a RESTful API or a SOAP API, an RPC-driven API, JDBC API, a streaming API, or adhere to one of many other API design methodologies. Moreover, data sources 102 may be additional resources that are not APIs. For example, in some embodiments, data sources 102 may include any appropriate data source that may be modeled using a dialect (described in further detail below).

Data sources 102 may access to data stored in a number of fashions, such as in a suitable data repository, either in a raw form or following (or at an intermediate step within) the application of a transformational capability. Data sources 102 may include data lakes, data silos, message streams, relational databases, semi-structured data (CSV, logs, xml, etc.), unstructured data, binary data (images, audio, video, etc.), or other suitable data types in appropriate repositories, both on-premises and on the cloud. Just for example, data sources 102 may provide data or functionalities by connecting to a CRM system (e.g., sources 102 may be an API provided by Salesforce to access CRM data), an ERP system, a database, an internet-Of-Things device, a mobile phone, a watch, a JIRA tasklist, a revision control system or other code management tool, and/or a multitude of other sources.

Data targets 104, e.g., data target 104A, data target 104B, data target 104C, may an API other technical resource or system to be included in an integration flow. While three data targets 104 are illustrated in FIG. 1 for reference, there may be any number of data targets 102 in the environment 100. In one embodiment, data targets 104 may include a data visualization tool such as TABLEAU that allows data to be explored and analyzed. In another embodiment, data targets 104 also be a static data source, e.g., data lakes, data silos, message streams, relational databases, semi-structured data (CSV, logs, xml, etc.), unstructured data, binary data (images, audio, video, etc.), or other suitable data types in appropriate repositories, both on-premises and on the cloud. Though displayed in FIG. 1 as being separate and distinct from data sources 102, in many architectures there may be overlap between the sources and the targets—i.e., a data source in one integration application may be a data target in a different integration application.

Integration platform 110 may be a software platform employed to access a plurality of software applications, services, and data sources and to design, maintain, and deploy integration flows drawing upon these disparate data sources. In some examples, integration platform 110 may incorporate at least one of an enterprise service bus (ESB) architecture, micro-service architecture, or service oriented architecture (SOA). In some embodiments, integration platform 110 may allow a user to build and deploy integrations that connect to third-party systems and provide additional functionalities to further integrate data from a wide-array of organizational and cloud-based data sources. Integration platform 110 may allow users to build integration flows and APIs and to design integration applications that access, manipulate, store, and leverage data from disparate technical resources.

As illustrated in FIG. 1, integration platform 110 may include design center 112, runtime services 114, connectors 116, data bridge adapter 118, versioning system 120, and data visualization tool 122.

Design center 112 may allow users to design integration applications and integration flows that access disparate data sources 102 and data targets 104. Design center 112 may provide a graphical design environment allowing a user to build, edit, deploy, monitor, and maintain integration applications. Design center 112 may provide a drag-and-drop interface that allows users to leverage pre-built assets, functions, security protocols, APIs, programming languages, connectors, and other suitable components. Design center 112 may standardize access to various data sources, provide connections to third-party systems and data, and provide additional functionalities to further integrate data from a wide-array of organizational and on-the-cloud data sources. Design center 112 may include the ability to enter a command to launch a data visualization tool and to generate an entity-relationship model from a particular data source.

Runtime services 114 may include runtime components for building, assembling, compiling, or otherwise creating executable object code for specific integration scenarios at runtime. In some embodiments, runtime components may create interpreted code to be parsed and applied upon execution. In some embodiments, runtime components may include a variety of intermediary hardware and/or software that runs and processes the output of integration flows. Runtime services 114 may provide a point of contact between data sources 102, data targets 104, and data bridge adapter 118. Runtime services 114 may also include various system APIs.

Connectors 116 may provide connections between the integration platform and external resources, such as databases, APIs for software as a service (SaaS) applications, and many other endpoints. Connectors 116 may themselves be APIs that are pre-built and selectable within design center 112 using a drag-and-drop interface. Connectors 116 may provide reliable connectivity solutions to connect to a wide range of applications integrating with, e.g., Salesforce, Amazon S3, Mongo Db, Slack, JIRA, SAP, Workday, Kafka, and many other assets. Connectors 116 may enable connection to various types of APIs including SOAP APIs, REST APIs, Bulk APIs, Streaming APIs, etc. Connectors 116 may be responsible for connecting to data sources 102 and data targets 104, authenticating, and performing raw operations to receive and insert data. Connectors 116 may support OAuth, Non-Blocking operations, stateless connection, low-level error handling, and reconnection.

Data bridge adapter 118 may support modeling of any API (or source otherwise capable of being modeled using a dialect) as an entity-relationship model. Data bridge adapter 118 may create and store a relational model based on raw data retrieved from the source and translate received raw data to the relational data model. Data bridge adapter 118 may include software that translates data form a particular data source into an entity-relationship model representation of the source model. Data bridge adapter 118 may also facilitate the use of data virtualization concepts to more readily interact with analytics and business intelligence applications, such as that described below with reference to data visualization tool 122. In this regard, data bridge adapter 118 may create a relational model in a format that allows analytics and business intelligence tools to ingest/view the data.

Data bridge adapter 118 may apply deduplication, normalization, and validation to the derived relational model before sending the results to a target destination, which may be a data visualization tool or another data storage location. Data bridge adapter 118 may employ connectors 116 to authenticate with and connect to data source 102. Data bridge adapter 118 may then retrieve a model (e.g., from an API specification such as RAML, OAS, GraphQL Schema, JSON Schema, etc.) or unstructured data in response to an appropriate request. In one embodiment, if data source 102 does not expose a model, a user may provide a model for use. In one embodiment, data bridge adapter 118 may move data from a data source in data sources 102 to a data target in data targets 104 while applying data and schema normalizations. In another embodiment, data bridge adapter may send the generated enterprise-relationship model to a data visualization tool. This avoids live queries to a third party system API by generating the JSON entity-relationship model that is readily accessible and interpretable by the data visualization tool. The components of data bridge adapter 118 is described in further detail below with reference to FIG. 2.

Versioning system 120 may support compatibility and versioning for integration platform 110 and data bridge adapter 110. Versioning system 120 may store versions of entity-relationship models when data bridge adapter 118 generates an entity-relationship model from a data source. Versioning system 120 may store additional information in association with the models including a date, a version number, and other suitable information. In an embodiment, each step in a transformation from source to target is versioned independently, and versioning system 120 records each change to a schema separately. Thus, versioning system 120 may keep a history of the change and lineage of each record, creating a new model definition in the graph each time that a change is detected in the stored models. The lineage graph may track a change history for each record in the data source and mark a change in the change history as compatible or incompatible.

Data visualization tool 122 may be an analytics platform that allows data analysts to use advanced visualization techniques to explore and analyze data. For example, a user may use TABLEAU or other visualization tool to generate advanced visualizations, graphs, tables, charts, etc. Data visualization tool 122 may be deployed on the cloud, on the premises, or otherwise deployed in integration platform 110. Data visualization tool 122 may have unique requirements for ingesting data. For example, in one embodiment, data visualization tool 122 may receive a JSON file or other representation of a relational model. In other embodiments, data visualization tool 122 may receive CSV data, PDF data, or other textual input. Data visualization tool 122 may employ connectors specific to various data sources to ingest data, however, this approach relies on a connector existing to allow the data to be ingested and may require the creation of additional code.

Figure 2:
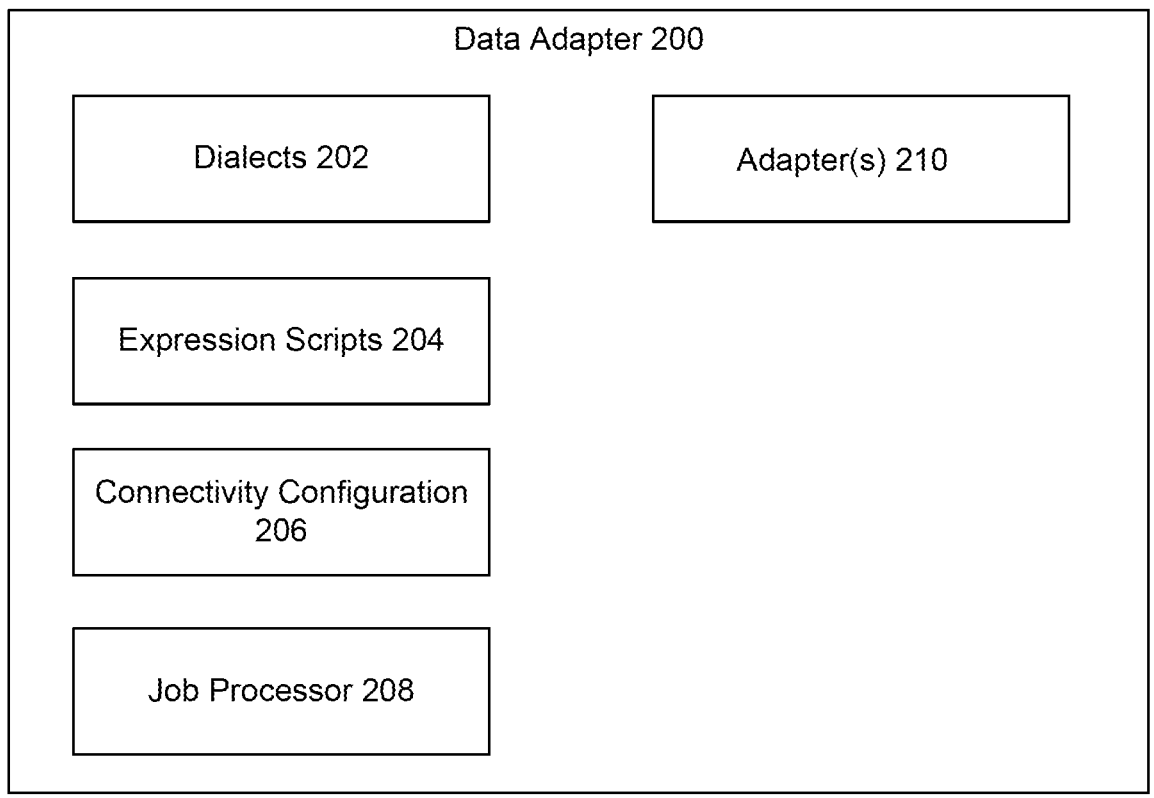
FIG. 2 is a block diagram of data bridge adapter, according to some embodiments.

FIG. 2 is a block diagram of data adapter 200. As illustrated in FIG. 2, data adapter 200 may include dialects 202, expression scripts 204, connectivity configuration 206, job processor 208, and adapters 210.

Data adapter 200 may perform data virtualization by using definitions in a dialect file (described below as dialects 202) and an expression script (described below as expression scripts 204). With an appropriate dialect and an appropriate script selected based on the type of the data source, data adapter 200 may programmatically build an entity-relationship model of data received from data sources 102.

In one example, the data source may be a WebAPI that defines a set of functions that can be performed and data that can be accessed using the HTTP protocol. In such an example, data adapter 200 may use a dialect that defines an entity-relationship diagram model representing the relational model of the WebAPI. With the WebAPI model defined in the dialect, data adapter 200 may use an expression script to move the data from the API response to the corresponding WebAPI model. In one embodiment, the resulting file may be a JSON file. While the above example describes WebAPI, this is merely illustrative, and the technique may be readily extended to any source that may be modeled using a dialect. For example, the data source could be an Evented API that receives Kafka events or publisher/subscriber events. In this example, data adapter 200 may map and transform based on these protocols.

Dialects 202 may be a metadata document that specifies a format/model of a particular API design methodology. Dialects 202 may be written in a declarative language for defining metadata that can be parsed into graphs of information. In one embodiment, dialects 202 may be written using Anything Modeling Language (AML) definitions, and an AML processor tool can parse and validate the instances of the metadata document. For example, a very minimal and merely illustrative AML dialect follows:

```
#%Dialect 1.0
dialect: Person Card
version: 1.0
external:
  schema: http://schema.org/
nodeMappings:
  PersonNode:
    classTerm: schema.Person
    mapping:
      name:
        propertyTerm: schema.name
        range: string
      born:
        propertyTerm: schema.birthDate
        range: date
documents:
  root:
    encodes: PersonNode
```

Using a similar construct, dialects 202 may be created that represent relational models of various API design methodologies. For example, one dialect may be created that models WebAPI. Another dialect in dialects 202 may be created to model a Salesforce API, another dialect to model a social media API, etc. In one embodiment, dialects 202 may be provided by integration platform 110 as stock functionality for a finite list of APIs. However, in other embodiments, dialects 202 may be extensible or customizable by particular customers to meet particular needs. In some embodiments, dialects 202 may be generated to model non-API data sources and anything that can be modeled using AML can conceivably be transformed into an entity-relationship mode. By data adapter 200.

Expression scripts 204 may be written in an expression language for accessing and transforming data. In one embodiment, this can be the DataWeave expression language, and the expression language may integrate with the components of integration platform 110. However, other programming, expression, and scripting languages may function suitably within the context of this disclosure. Expression scripts 204 may parse and validate data received from an API according to a dialect in dialects 202. In an embodiment, the data received may be a JSON document, and expression scripts 204 may receive the payload in JSON and apply appropriate transformations. In one illustrative example, a dataweave script may apply renameKey( ) function over a payload to rename an "id" field and a "name" field as in the following:

```
%dw 2.0
input payload application/json
output application/json
fun renameKey(key: Key) = key match {
    case "id"->"user_id"
    case "name"->"user_name"
    else -> (key)
}
payload.user_json map ($ mapObject
    ((value, key, i) -> (renameKey(key)): value))
```

The outcome of the application of expression scripts 204 may also be a JSON document that encodes a graph of information described in the dialect. As with dialects 202, a unique script may be created in expression scripts 204 for each API design methodology. Thus, an expression script may exist for WebAPI, one for Salesforce, etc. Expression scripts 204 may serve to transform the source model received from the API into the adapter model as defined by the associated dialect in dialects 202. The expression script may move the data from the responses received from the API to the entity-relationship model.

In one embodiment, expression scripts 204 may be provided by integration platform 110 as stock functionality for a finite list of APIs and thus operate behind the scenes to perform the needed transformations. In other embodiments, expression scripts 204 may be extensible or customizable by particular customers to meet particular needs.

Connectivity configuration 206 may provide the services for handling the connections to various sources and targets, i.e. data sources 102 and data targets 104. Connectivity configuration 206 may store login information, addresses, URLs, and other credentials for accessing data sources 102 and data targets 104. Connectivity configuration 206 may be employed by data adapter 200 to establish a connection and to maintain the connection itself, e.g., through connectors-as-a-service (CaaS).

Job processor 208 may perform additional transformations on an entity-relationship model derived from a data source. Job processor 208 may perform configurations specified by a user in the interface when creating the entity-relationship model or standardized jobs needed based on the selected data target. Job processor 208 may transform or reliable a particular data field based on the unique requirements of the user or the target system to an expected representation. For example, job processor 208 may modify the data as required for a particular data visualization tool's requirements. In some embodiments, job processor 208 may perform its functions with reference to external APIs or other functionality. For example, if a data field is an image blob, then job processor may engage a machine learning program that determines what the image actually is, and the output in the entity-relationship model can be transformed to describe what the image actually is (instead of a blob of meaningless characters). In some embodiments, job processor may leverage a java database connectivity application programming interface to manipulate and transform the data.

Adapters 210 may include information required to connect to various types of API and other data sources. For example, adapters 210 may include components for connecting to APIs, via JDBC, stream adapters, file adapters, etc. One skilled in the arts that the various components needed for adapters 210 may vary based on the type of adapter used.

Figure 3:
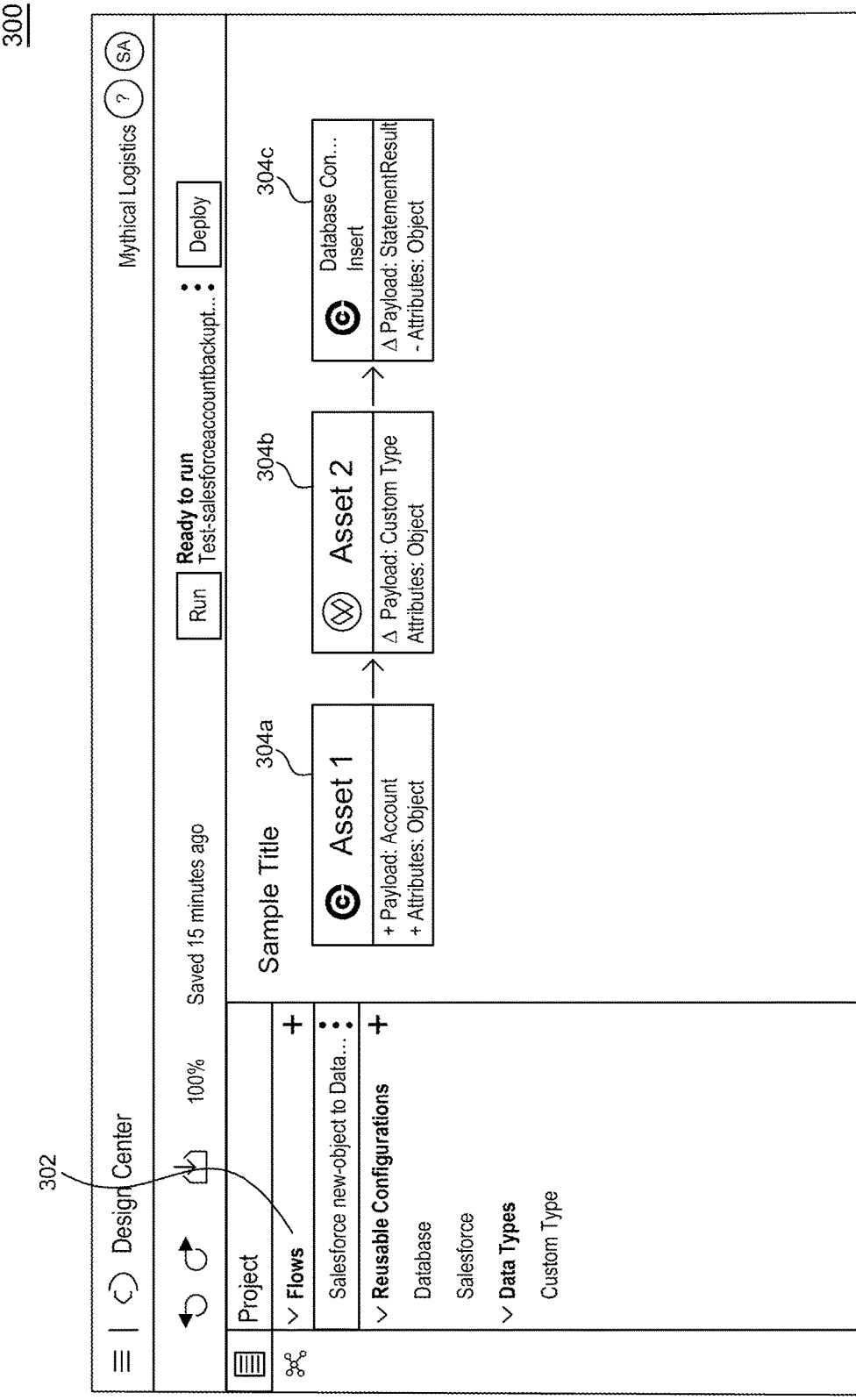
FIG. 3 is an example screen display of an integration flow design tool, according to some embodiments.

FIG. 3 is example screen display 300 of an integration flow design tool, according to some embodiments. Screen display 300 portrays an overview of an integration flow. The screen display provided in FIG. 3 is merely exemplary, and one skilled in the relevant art(s) will appreciate that many approaches may be taken to provide a suitable screen display 300 in accordance with this disclosure. Screen display 300 may include navigation bar 302 and assets 304.

Navigation bar 302 may provide abilities for a user to maneuver between and among screens and flows in design center 112. Navigation bar 302 may include links, textual indicator, graphical indicators, and appropriate combinations thereof. For example, navigation bar 302 may display accessible integration flows, previously deployed configurations, common data types, tools for use in designing an integration flow, etc. Navigation bar 302 may further include a link to access entity-relationship diagrams, histories, versioning, lineage graphs, detected changes, etc.

Assets 304, for example asset 304a, asset 304b, and asset 304c may represent disparate technical resources, such as those described above with reference to data sources 102 and data targets 104. Assets 304 may connect to data sources within an organization's enterprise landscape or assets 304 may connect to cloud-stored data sources. Assets 304 may be pre-built and allow an integration flow to connect to a particular data source or employ a particular data protocol. Assets 304 may contain fields used by the underlying asset. Assets 304 may include a type, for example, an indication that the asset connects to a particular type of data source (e.g., a SQL Server instance). In an embodiment, a user may enter a command to generate a relational model by selecting the asset and indicating that it is the data source to be used to generate the relational model. In such an embodiment, a user may also specifying target information, jobs to perform, desired transformations, and other parameters related to the generation and application of the entity-relationship model.

Figure 4:
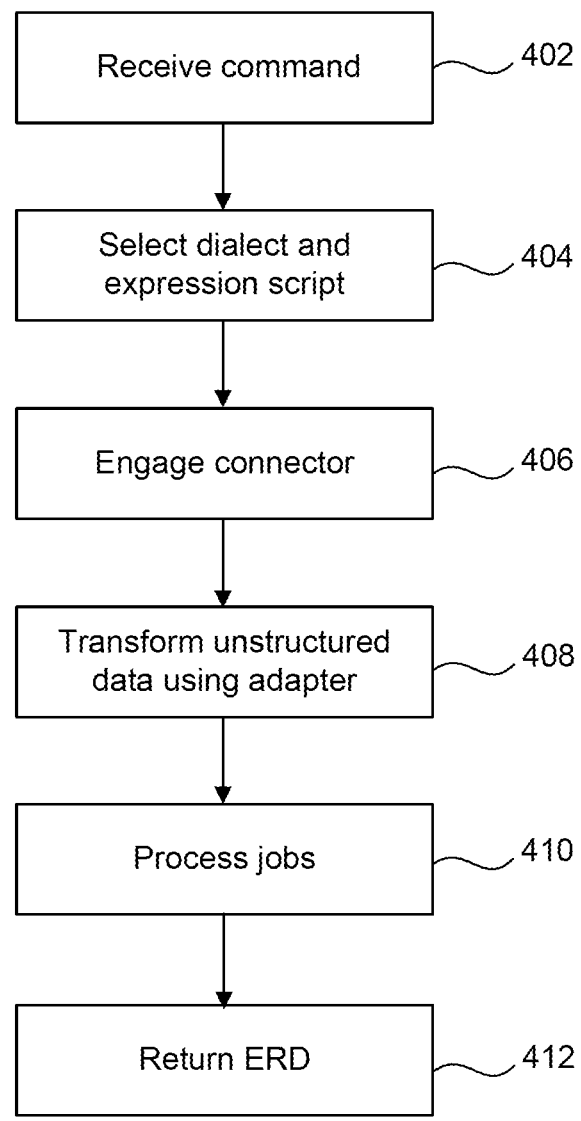
FIG. 4 illustrates a method for modeling an application programming interfaces as an entity-relationship models in an integration platform, according to some embodiments.

FIG. 4 illustrates a method 400 for modeling an application programming interfaces as an entity-relationship models in an integration platform, according to some embodiments. Method 400 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

In 402, integration platform 110 may receive a command in design center 112 to create an entity-relationship diagram. The command may specify a data source among data sources 102. This data source indicates the location from which data will be accessed, e.g., from a particular API. The command may further specify data target 104 as a location to which the data will be sent, though not necessarily so. The command may also specify fields, entities, relationship between entities, data types, and transformations. In some embodiments, the user may select a data visualization tool, such as data visualization tool 122, as the data target. The command may also indicate particular jobs or transformations to perform against the unstructured data received from the API through a variety of different mechanisms.

In 404, integration platform 110 may engage data bridge adapter 118 to retrieve an appropriate dialect from dialects 202 and an appropriate expression script from expression scripts 204. Both the dialect and the expression script may correspond to the design methodology of an API offered by the configured data source or otherwise to a type of the data source for non-API embodiments. The dialect may represent a model of the relevant API design methodology using metadata while the expression script may be software written to transform the source model received from the API into the adapter model as defined by the associated dialect in dialects 202.

In 406, integration platform 110 may engage an appropriate connector among connectors 116 to receive data from the selected data source among data sources 102. The connector may engage connectivity configuration 206 to access and authenticate at the data source. The connector may then perform required raw operations to receive unstructured data. The connector may provide reliable connectivity solutions to connect to a wide range of applications integrating with, e.g., Salesforce, Amazon S3, Mongo Db, Slack, JIRA, SAP, Workday, Kafka, and many other assets.

In 408, integration platform 110 may engage data bridge adapter 118 to transform the unstructured data using an appropriate adapter and use the selected expression script to transform the data to match the dialect selected in 404. Through the use of data bridge adapter 118, integration platform 110 may transform the shape of the data into the ERD model to virtualize the data. The nature of the data may vary across APIs and across the different types of data sources that may be accessed. For example, if the API is a WebAPI, the result may be an XML, JSON or other media type response that includes the anticipated fields. One skilled in the arts will appreciate that the data received from APIs may arrive in a variety of formats.

In 410, integration platform 110 may engage job processor 208 to complete any additional configured jobs. In an embodiment, additional transformations may need to be performed based on a data target, e.g., a particular data destination or a particular data visualization tool. In some embodiments, job processor 208 may access an external resource, e.g., another API, to perform a transformation.

In 412, integration platform 110 may return the entity-relationship model. In one approach, integration platform may return a simple JSON file containing the entity-relationship model. In another approach, integration platform 110 may launch data visualization tool 122 and open the entity-relationship model or otherwise load data visualization tool 122 with the entity-relationship model being viewable. As discussed below in FIG. 5, integration platform may further transmit the information to a selected data target.

Figure 5:
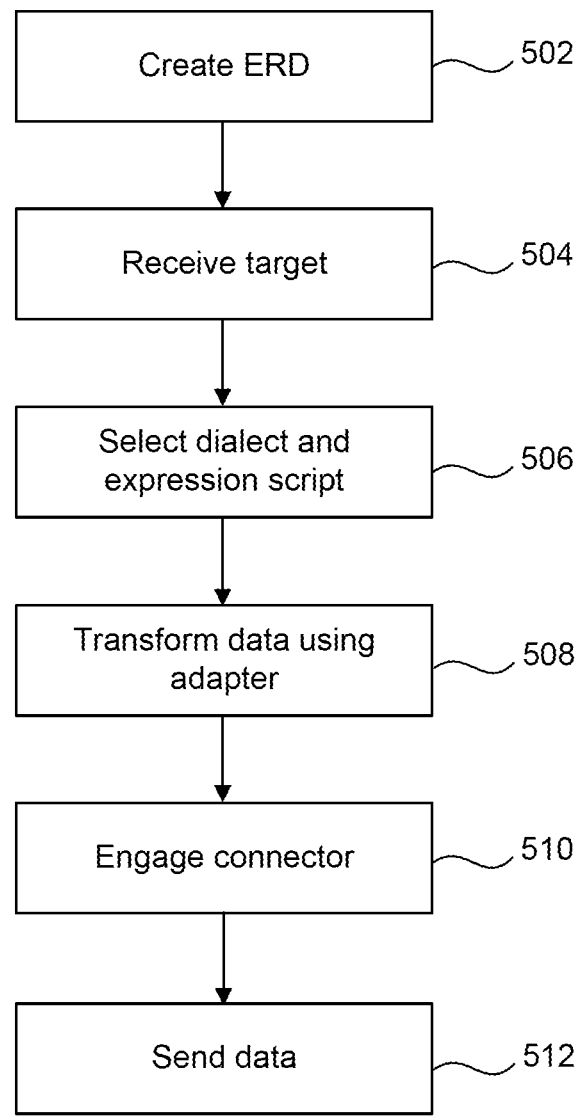
FIG. 5 illustrates a method for transmitting data from a generated entity-relationship model to a data target, according to some embodiments.

FIG. 5 illustrates a method 500 for transmitting data from a generated entity-relationship model to a data target, according to some embodiments. Method 500 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art(s).

In 502, integration platform 110 may engage data bridge adapter 118 to create an entity-relationship model based on received command/configuration that specifies data source 102. This process is described in further detail above with reference to FIG. 4

In 504, integration platform 110 may receive additional configuration information that specifies data target 104. In some embodiments, this information may be received when data source 102 is specified or at a later point. In addition to specifying data target 104, the configuration information may include additional transformations to be performed by job processor 208.

In 506, integration platform 110 may engage data bridge adapter 118 to select an appropriate dialect and expression script based on a type of the API or a design methodology of the API specified at data target 104. Both the dialect and the expression script may correspond to the design methodology of an API offered by the configured data source or otherwise to a type of the data source for non-API embodiments. The dialect may represent a model of the relevant API design methodology using metadata while the expression script may be software written to transform the source model received from the API into the adapter model as defined by the associated dialect in dialects 202

In 508, integration platform 110 may engage data bridge adapter 118 to transform the data in the entity-relationship model to the to match the selected dialect for the destination API using the corresponding expression script. In this regard, the process of FIG. 5 works backwards from the process described in FIG. 4, as data bridge adapter 118 transforms the generated entity-relationship model into actionable steps required by the destination API/data target.

In 510, integration platform 110 may engage an appropriate connector among connectors 116 to receive data from the selected data source among data sources 102. The connector may engage connectivity configuration 206 to access and authenticate at the data source. The connector may then perform required raw operations to receive unstructured data. The connector may provide reliable connectivity solutions to connect to a wide range of applications integrating with, e.g., Salesforce, Amazon S3, Mongo Db, Slack, JIRA, SAP, Workday, Kafka, and many other assets.

In 512, integration platform 110 may transmit the data to data target 104 via the connector engaged in 510. For example, integration platform 110 may insert data into a relational data, engage needed API calls to insert data, perform a bulk insert, or perform other suitable functions to transmit the data to the target.

Figure 6:
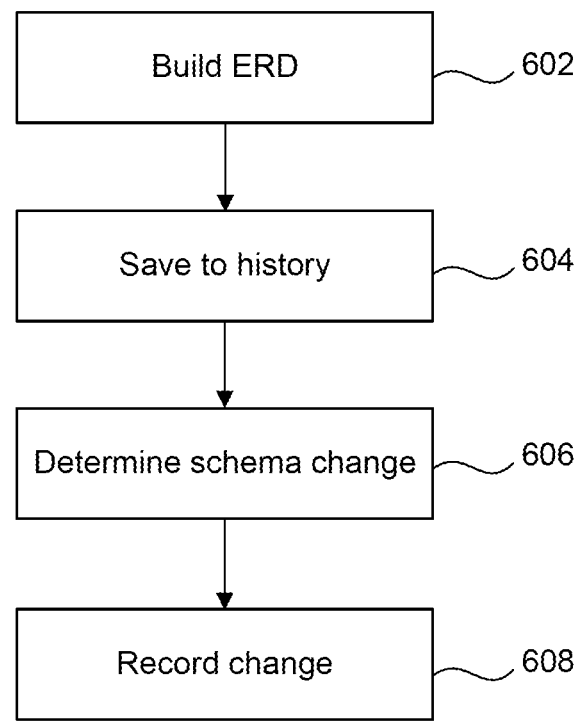
FIG. 6 illustrates a method for performing versioning of a data source in an integration platform based on a generated entity-relationship model, according to some embodiments.

FIG. 6 illustrates a method 600 for performing versioning of a data source in an integration platform based on a generated entity-relationship model, according to some embodiments. Method 600 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art(s).

In 602, integration platform 110 may engage data bridge adapter 118 to create an entity-relationship model based on received command/configuration that specifies data source 102. This process is described in further detail above with reference to FIG. 4.

In 604, integration platform 110 may save the entity-relationship model to a history of stored entity-relationship models corresponding to the data source from which the entity-relationship model was generated. The history may be stored in versioning system 120 in a suitable format.

In 606, integration platform 110 may determine a schema change that occurred at the particular source by comparing the entity-relationship model to the stored history of entity-relationship models in versioning system 120. Versioning system 120 may perform automatic detection when data source 102 exposes metadata about the schema that may be compared to data bridge adapter 118's internal model to find differences. Versioning system 120 may detect various types of changes and determine whether they are compatible (i.e. may be applied in the target without user intervention) or incompatible. Various types of schema changes may be detected including: (1) new entities and attributes; (2) removed entities and attributes; (3) data-type changes; (4) semantic changes; and others.

In 608, integration platform 110 may record the change for future analysis. Versioning system 120 may keep a history of the change and lineage of each record, creating a new model definition in the graph each time that a change is detected in a stored models. Integration platform 110 may present a linage graph or other representation of data set changes that indicates the change.

Figure 7:
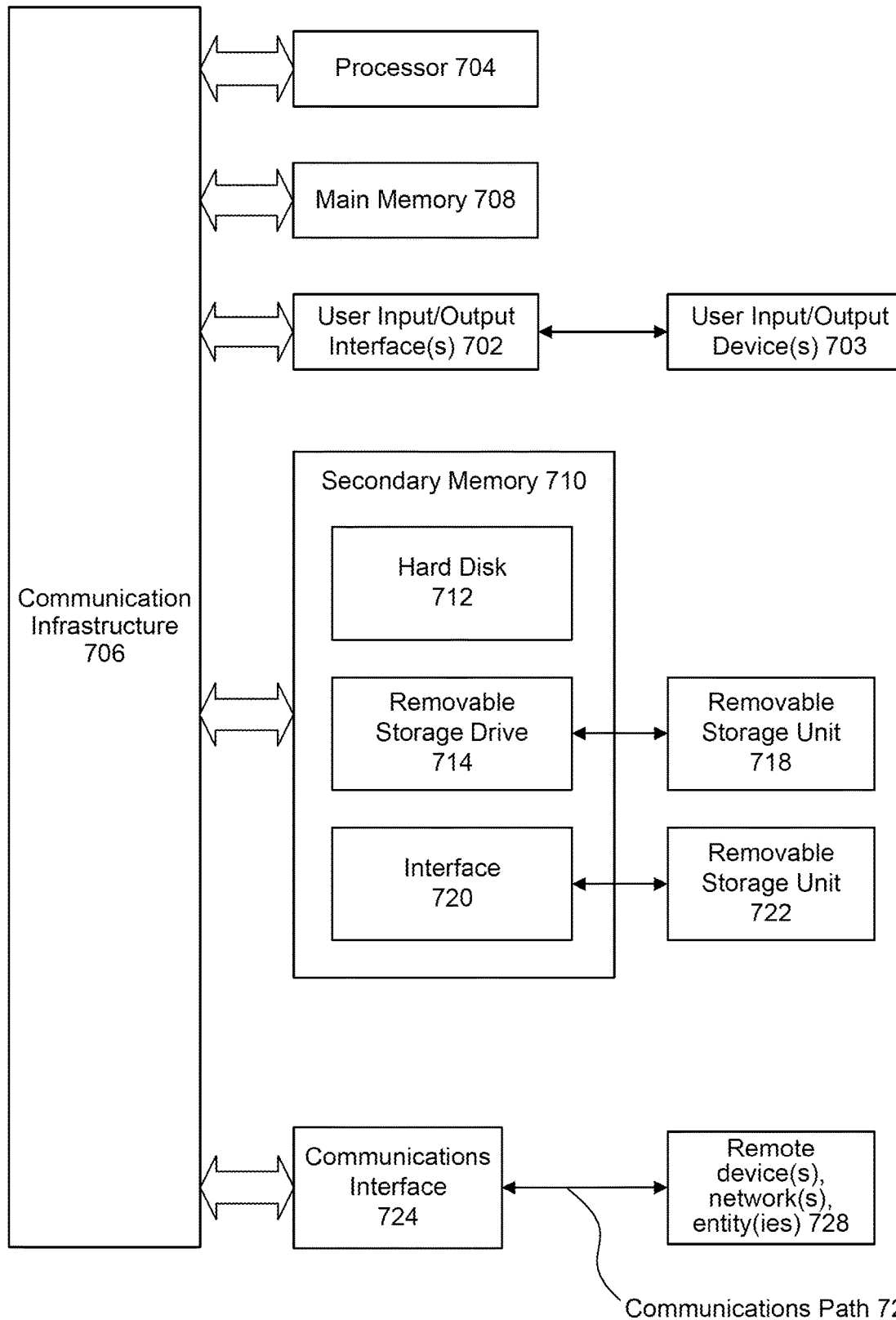
FIG. 7 illustrates a computer system, according to exemplary embodiments of the present disclosure.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 708, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, a tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   in response to receiving a command to generate an entity-relationship model in a data integration platform that specifies a data source accessible via an application programming interface (API) having a type, selecting, by one or more processors, based on the type, a markup language dialect from one or more markup language dialects and an expression language script from one or more expression language scripts, wherein the markup language dialect and the expression language script correspond to an API design methodology, and wherein the markup language dialect includes a specification of a format of the API design methodology written in a modeling language;
   validating, by the one more processors, unstructured data received in response to accessing the API using the markup language dialect;
   generating the entity-relationship model by transforming the unstructured data to match the format of the API design methodology using the expression language script;
   determining a change to the API by comparing the entity-relationship model to a previously generated entity-relationship model that is specific to the data source and is stored in a stored history of entity-relationship models for the data source;
   recording the change in a change history for the data source and storing the entity-relationship model in the stored history of entity-relationship models; and
   creating a lineage graph of the data source based on the entity-relationship model, wherein the lineage graph tracks a change for each record in the data source and marks the change in the change history as compatible or incompatible.

2. The method of claim 1, further comprising:
   transmitting, by the one or more processors, the entity-relationship model from the data integration platform to a data visualization software tool via a second API provided by the data visualization software tool.

3. The method of claim 1, further comprising:
   receiving, by the one or more processors, the unstructured data from the API using a connector that establishes a connection to the data source using a connectivity configuration.

4. The method of claim 1, wherein the command further specifies a data target accessible via a second API having a second type, further comprising:
   selecting, by the one or more processors, a second markup language dialect from the one or more markup language dialects and a second expression language script from the one or more expression language scripts;
   transforming, by the one or more processors, the entity-relationship model into second unstructured data matching a second format of the second markup language dialect using the second expression language script; and inserting, by the one or more processors, the second unstructured data into the data target using a connector that establishes a connection to the data target via the second API.

5. The method of claim 1, further comprising:
performing, by the one or more processors, a job on the entity-relationship model that transforms the entity-relationship model to an expected representation.

6. The method of claim 1, further comprising:
storing a date and a version number in association with the entity-relationship model.

7. A system, comprising:
a memory; and
at least one processor coupled to the memory and configured to:
in response to receiving a command to generate an entity-relationship model in a data integration platform that specifies a data source accessible via an application programming interface (API) having a type, select based on the type, a markup language dialect from one or more markup language dialects and an expression language script from one or more expression language scripts, wherein the markup language dialect and the expression language script correspond to an API design methodology, and wherein the markup language dialect includes a specification of a format of the API design methodology written in a modeling language;
validate unstructured data received in response to accessing the API using the markup language dialect;
generate the entity-relationship model by transforming the unstructured data to match the format of the API design methodology using the expression language script;
determine a change to the API by comparing the entity-relationship model to a previously generated entity-relationship model that is specific to the data source and is stored in a stored history of entity-relationship models for the data source;
record the change in a change history for the data source and store the entity-relationship model in the stored history of entity-relationship models; and
create, by the one or more processors, a lineage graph of the data source based on the entity-relationship model, wherein the lineage graph tracks a change for each record in the data source and marks the change in the change history as compatible or incompatible.

8. The system of claim 7, the at least one processor further configured to:
transmit the entity-relationship model from the data integration platform to a data visualization software tool via a second API provided by the data visualization software tool.

9. The system of claim 7, the at least one processor further configured to:
receive the unstructured data from the API using a connector that establishes a connection to the data source using a connectivity configuration.

10. The system of claim 7, wherein the command further specifies a data target accessible via a second API having a second type, the at least one processor further configured to:
select a second markup language dialect from the one or more markup language dialects and a second expression language script from the one or more expression language scripts;
transform the entity-relationship model into second unstructured data matching a second format of the second markup language dialect using the second expression language script; and
insert the second unstructured data into the data target using a connector that establishes a connection to the data target via the second API.

11. The system of claim 7, the at least one processor further configured to:
perform a job on the entity-relationship model that transforms the entity-relationship model to an expected representation.

12. The system of claim 7, the at least one processor further configured to:
store a date and a version number in association with the entity-relationship model.

13. A non-transitory computer-readable device having instructions stored thereon that, when executed by at least one computing device, cause the at least one computing device to perform operations comprising:
in response to receiving a command to generate an entity-relationship model in a data integration platform that specifies a data source accessible via an application programming interface (API) having a type, selecting based on the type, a markup language dialect from one or more markup language dialects and an expression language script from one or more expression language scripts, wherein the markup language dialect and the expression language script correspond to an API design methodology, and wherein the markup language dialect includes a specification of a format of the API design methodology written in a modeling language;
validating unstructured data received in response to accessing the API using the markup language dialect;
generating the entity-relationship model by transforming the unstructured data to match the format of the API design methodology using the expression language script;
determining a change to the API by comparing the entity-relationship model to a previously generated entity-relationship model that is specific to the data source and is stored in a stored history of entity-relationship models for the data source;
recording the change in a change history for the data source and storing the entity-relationship model in the stored history of entity-relationship models; and
creating a lineage graph of the data source based on the entity-relationship model, wherein the lineage graph tracks a change for each record in the data source and marks the change in the change history as compatible or incompatible.

14. The non-transitory computer-readable device of claim 13, the operations further comprising:
transmitting the entity-relationship model from the data integration platform to a data visualization software tool via a second API provided by the data visualization software tool.

15. The non-transitory computer-readable device of claim 13, the operations further comprising:
receiving the unstructured data from the API using a connector that establishes a connection to the data source using a connectivity configuration.

16. The non-transitory computer-readable device of claim 13, the operations further comprising:
selecting a second markup language dialect from the one or more markup language dialects and a second expression language script from the one or more expression language scripts;

transforming the entity-relationship model into second unstructured data matching a second format of the second markup language dialect using the second expression language script; and inserting the second unstructured data into the data target using a connector that establishes a connection to the data target via the second API.

17. The non-transitory computer-readable device of claim 13, the operations further comprising:

performing a job on the entity-relationship model that transforms the entity-relationship model to an expected representation.

18. The non-transitory computer-readable device of claim 13, the operations further comprising:

storing a date and a version number in association with the entity-relationship model.

* * * * *